(12) United States Patent
Ye et al.

(10) Patent No.: US 10,745,558 B2
(45) Date of Patent: Aug. 18, 2020

(54) COMPOSITIONS INCLUDING A POLYTHIOL, AN UNSATURATED COMPOUND, AND A DYE AND METHODS RELATING TO SUCH COMPOSITIONS

(71) Applicant: 3M INNOVATIVE PROPERTIES COMPANY, St. Paul, MN (US)

(72) Inventors: Sheng Ye, Woodbury, MN (US); Kathleen S. Shafer, Woodbury, MN (US); Michael S. Wendland, North St. Paul, MN (US); Susan E. DeMoss, Stillwater, MN (US); Jonathan D. Zook, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/739,485

(22) PCT Filed: Jun. 28, 2016

(86) PCT No.: PCT/US2016/039769
§ 371 (c)(1),
(2) Date: Dec. 22, 2017

(87) PCT Pub. No.: WO2017/004015
PCT Pub. Date: Jan. 5, 2017

(65) Prior Publication Data
US 2018/0187009 A1   Jul. 5, 2018

Related U.S. Application Data

(60) Provisional application No. 62/185,775, filed on Jun. 29, 2015.

(51) Int. Cl.
| | |
|---|---|
| C09B 29/045 | (2006.01) |
| C08L 81/04 | (2006.01) |
| C08K 5/23 | (2006.01) |
| C09K 3/10 | (2006.01) |
| C08F 291/04 | (2006.01) |
| C08K 5/47 | (2006.01) |
| C08F 216/12 | (2006.01) |
| C08F 222/26 | (2006.01) |
| C08K 3/04 | (2006.01) |
| C08K 3/26 | (2006.01) |
| C08K 3/34 | (2006.01) |
| C08K 3/36 | (2006.01) |
| C08L 81/02 | (2006.01) |

(Continued)

(52) U.S. Cl.
CPC .......... *C08L 81/04* (2013.01); *C08F 216/125* (2013.01); *C08F 222/26* (2013.01); *C08F 291/04* (2013.01); *C08K 3/04* (2013.01); *C08K 3/26* (2013.01); *C08K 3/346* (2013.01); *C08K 3/36* (2013.01); *C08K 5/23* (2013.01); *C08K 5/47* (2013.01); *C08L 81/02* (2013.01); *C09B 29/0088* (2013.01); *C09K 3/1012* (2013.01); *C08K 5/0041* (2013.01); *C08K 2003/265* (2013.01)

(58) Field of Classification Search
None
See application file for complete search history.

(56) References Cited

U.S. PATENT DOCUMENTS

| | | |
|---|---|---|
| 2,466,963 A | 4/1949 | Patrick |
| 2,789,958 A | 4/1957 | Fettes |
| 2,891,942 A | 6/1959 | Merian |

(Continued)

FOREIGN PATENT DOCUMENTS

| | | |
|---|---|---|
| CN | 101328320 | 12/2008 |
| CN | 103113759 | 5/2013 |

(Continued)

OTHER PUBLICATIONS

Software translation of JP 2008-144103 A to Kojima Tatsuie et al, published in 2008; obtained from Espacenet on Apr. 13, 2019. (Year: 2008).*
Chen, "Synthesis and spectroscopic characterization of an alkoxysilane dye containing azo-benzothiazole chromophore for nonlinear optical applications", Dyes and Pigments, 2007, vol. 73, pp. 338-343.
Cojocariu, "Synthesis and optical storage properties of a novel polymethacrylate with benzothiazole azo chromophore in the side chain", Journal of materials chemistry, 2004, vol. 14, No. 19, pp. 2909-2916.

(Continued)

*Primary Examiner* — Christopher Adam Hixson
*Assistant Examiner* — Michelle Adams

(57) ABSTRACT

A curable composition having a polythiol; at least one unsaturated compound comprising more than one carbon-carbon double bond, carbon-carbon triple bond, or a combination thereof; and a dye compound represented by formula (I). A crosslinked composition prepared from the curable composition, a method of making an at least partially crosslinked network, a method for indicating curing in a curable composition, and a method of stabilizing a curable composition comprising a polythiol and at least one unsaturated compound comprising more than one carbon-carbon double bond, carbon-carbon triple bond, or a combination thereof are also disclosed. Z is not reactive with the polythiol or unsaturated compound.

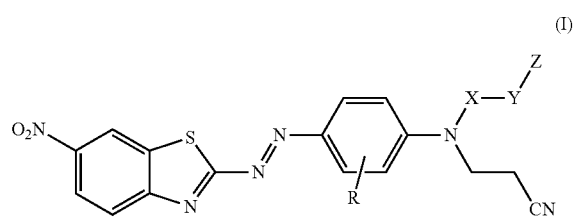

(I)

20 Claims, No Drawings

(51) Int. Cl.
*C09B 29/033* (2006.01)
*C08K 5/00* (2006.01)

(56) References Cited

U.S. PATENT DOCUMENTS

| | | | |
|---|---|---|---|
| 3,207,614 | A | 9/1965 | Canevari |
| 3,382,296 | A | 5/1968 | Tenquist |
| 3,390,121 | A | 6/1968 | Burford |
| 3,773,706 | A | 11/1973 | Dunn, Jr. |
| 4,160,064 | A | 7/1979 | Nodiff |
| 4,164,492 | A | 8/1979 | Cooper |
| 4,165,425 | A | 8/1979 | Bertozzi |
| 4,232,136 | A | 11/1980 | Kovacsay |
| 4,241,166 | A | 12/1980 | Klupfel |
| 4,366,307 | A | 12/1982 | Singh |
| 4,370,428 | A | 1/1983 | Danville |
| 4,440,681 | A | 4/1984 | Tappe |
| 4,460,719 | A | 7/1984 | Danville |
| 4,467,079 | A | 8/1984 | Hechenberger |
| 4,522,963 | A | 6/1985 | Kecskemethy |
| 4,609,762 | A | 9/1986 | Morris |
| 4,734,101 | A | 3/1988 | Himeno |
| 5,225,472 | A | 7/1993 | Cameron |
| 5,302,627 | A | 4/1994 | Field |
| 5,387,488 | A | 2/1995 | Kaneko |
| 5,610,243 | A | 3/1997 | Vietti |
| 5,912,319 | A | 6/1999 | Zook |
| 5,933,559 | A | 8/1999 | Petisce |
| 5,958,584 | A | 9/1999 | Petisce |
| 5,959,071 | A | 9/1999 | DeMoss |
| 6,162,842 | A | 12/2000 | Freche |
| 6,172,179 | B1 | 1/2001 | Zook |
| 6,444,725 | B1 | 9/2002 | Trom |
| 6,447,708 | B1 | 9/2002 | Thépot et al. |
| 6,455,158 | B1 | 9/2002 | Mei |
| 6,465,544 | B1 | 10/2002 | Bomal |
| 6,509,418 | B1 | 1/2003 | Zook |
| 6,518,356 | B1 | 2/2003 | Friese |
| 6,778,753 | B2 | 8/2004 | Blomquist |
| 7,691,557 | B2 | 4/2010 | Bachmann |
| 7,871,446 | B2 | 1/2011 | Jordan |
| 8,729,198 | B2 | 5/2014 | Keledjian et al. |
| 9,772,321 | B2 | 9/2017 | Wendland |
| 10,072,135 | B2 | 9/2018 | Ye |
| 10,233,307 | B2 * | 3/2019 | Schulz ............. C09C 1/00 |
| 2003/0027903 | A1 | 2/2003 | Nwoko |
| 2003/0065069 | A1 | 4/2003 | Wojciak |
| 2003/0139488 | A1 | 7/2003 | Wojciak |
| 2003/0181546 | A1 | 9/2003 | Hettich |
| 2004/0141230 | A1 | 7/2004 | Kosaka |
| 2004/0247792 | A1 | 12/2004 | Sawant |
| 2006/0175005 | A1 * | 8/2006 | Sawant ............. C08L 81/02 156/307.1 |
| 2006/0202158 | A1 * | 9/2006 | Chen ............. C09B 67/0079 252/186.1 |
| 2007/0021526 | A1 | 1/2007 | He |
| 2010/0311184 | A1 | 12/2010 | Diwu |
| 2011/0171609 | A1 | 7/2011 | Yang |
| 2016/0032059 | A1 * | 2/2016 | Ye ............. C08G 75/00 522/64 |
| 2016/0319105 | A1 | 11/2016 | Schultz |

FOREIGN PATENT DOCUMENTS

| | | |
|---|---|---|
| DE | 206006 | 1/1984 |
| EP | 1308477 | 10/2002 |
| JP | 50-69381 | 6/1975 |
| JP | 59120612 | 7/1984 |
| JP | 61-200170 | 4/1986 |
| JP | 62-034958 | 2/1987 |
| JP | H10-237335 | 8/1998 |
| JP | 2001-131436 | 5/2001 |
| JP | 2008-144103 | 6/2008 |
| WO | WO 2013-090988 | 6/2013 |
| WO | WO 2013-151893 | 10/2013 |
| WO | WO 2014066039 | 5/2014 |
| WO | WO 2014-164244 | 10/2014 |
| WO | WO 2014-172305 | 10/2014 |
| WO | WO-2014164103 A1 * | 10/2014 ............. C08G 75/00 |

OTHER PUBLICATIONS

Peters, "Disperse Dyes: 4-Hetarylazo Derivatives from N-β-Cyanoethyl-N-β- Hydroxyethylaniline", Journal Chemical Technology Biotechnology 1992, vol. 53, pp. 301-308.

Peters, "Monoazo Disperse Dye Derived from Nitro-2-Aminobenzothiazoles", Dyes and Pigments, 1995, vol. 28, pp. 151-164.

Peters, "New Dyes and their Intermediates for Synthetic-polymer Fibres: III *—Halogenobenzothiazolylazo Dyes", Journal of the Society of Dyers and Colourists, 1969, vol. 85, pp. 507-509.

Sanchez, "Applications of advanced hybrid organic-inorganic nanomaterials: from laboratory to market", Chemical Society Reviews, 2011, vol. 40, pp. 696-753.

Towns, "Developments in azo disperse dyes derived from heterocyclic diazo components", Dyes and Pigments, 1999, vol. 42, pp. 3-28.

International Search report for PCT International Application No. PCT/US2016/039769 dated Oct. 7, 2016, 4 pages.

* cited by examiner

COMPOSITIONS INCLUDING A POLYTHIOL, AN UNSATURATED COMPOUND, AND A DYE AND METHODS RELATING TO SUCH COMPOSITIONS

CROSS-REFERENCE TO RELATED APPLICATION

This application is a national stage filing under 35 U.S.C. 371 of PCT/US2016/039769, filed Jun. 28, 2016, which claims priority to U.S. Provisional Application No. 62/185,775, filed Jun. 29, 2015, the disclosure of which is incorporated by reference in its entirety herein.

BACKGROUND

Inclusion of a dye in a curative or catalyst composition can be useful, for example, when the curative or catalyst must be admixed with a curable resin before placement and curing the resin. The dye can be useful, for example, for indicating that the curative or catalyst is uniformly mixed with the curable resin. Peroxide and dye formulations in which the color disappears when the peroxide is used to generate radicals during the cure of a curable resin are also known. See, for example, Japanese Pat. Appl. Kokai No. SHO 59-120612, published Jul. 21, 1984, and U.S. Pat. Appl. Pub. No. 2006/0202158 (Chen et al.). Although there are many ways to determine the extent of cure in cured systems, most methods require sampling and subsequent analysis of that sample using any of a number of techniques (e.g., spectroscopy, chromatography, and rheological measurements). These methods require equipment and may require interruption of a process since many of these methods cannot be performed while a manufacturing process is taking place. In addition, many of the analysis methods require a skilled user capable of interpreting results. Formulations including a dye and a catalyst or curative in which the color disappears upon curing provide a visual indication of cure, which does not require equipment or extensive interpretation.

SUMMARY

Compositions and methods according to the present disclosure include a dye compound, a polythiol, and at least one unsaturated compound having more than one carbon-carbon double bond, carbon-carbon triple bond, or a combination thereof. Compositions containing such polythiols and unsaturated compounds are commonly referred to as thiol-ene or ene-thiol compositions and cure by free-radical initiated polymerization. The dye provides a visible color change when free-radicals are generated in the compositions upon curing. Typically, and surprisingly, the dye compound also provides a free-radical inhibiting effect to prevent premature polymerization in the compositions disclosed herein.

In one aspect, the present disclosure provides a curable composition having a polythiol; at least one unsaturated compound having more than one carbon-carbon double bond, carbon-carbon triple bond, or a combination thereof; and a dye compound represented by formula:

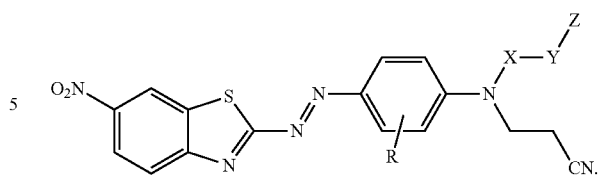

In another aspect, the present disclosure provides a cross-linked polymer network including a polythiol crosslinked with at least one unsaturated compound having more than one carbon-carbon double bond, carbon-carbon triple bond, or a combination thereof and a dye compound represented by formula:

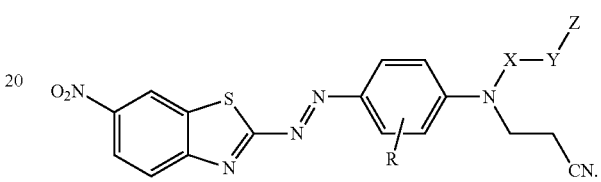

In another aspect, the present disclosure provides a method for indicating curing in a curable composition. The method includes providing the curable composition described above and allowing the composition to cure to provide a cured composition. The dye compound is present in the composition in an amount sufficient to provide the composition with a first absorbance at a wavelength in a range from 400 nanometers to 700 nanometers, and the cured composition has a second absorbance at the wavelength that is different from the first absorbance.

In another aspect, the present disclosure provides a method of stabilizing a curable composition including a polythiol and at least one unsaturated compound having more than one carbon-carbon double bond, carbon-carbon triple bond, or a combination thereof. The method includes combining in the composition a dye compound in an amount sufficient to reduce a viscosity increase of the curable composition relative to a comparative composition that is the same as the curable composition except that it does not contain the dye compound. The dye compound is represented by formula:

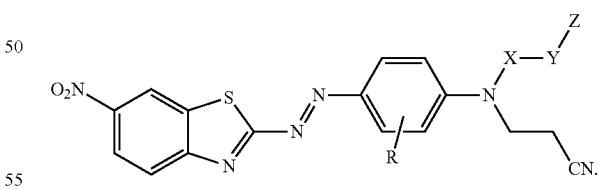

In any of the aforementioned aspects, R is hydrogen or alkyl; X is alkylene optionally interrupted by —O—; Y is a bond, —O—, —S—, —NR$^1$—, —N(R$^1$)—C(O)—, —C(O)—N(R$^1$)—, —O—C(O)—, —C(O)—O—, —S—C(O)—, —C(O)—S—, —O—C(S)—, —C(S)—O—, —O—C(O)—O—, —S—C(O)—O—, —O—C(O)—S—, —(R$^1$)N—C(O)—O—, —O—C(O)—N(R$^1$)—, —(R$^1$)N—C(S)—O—, —O—C(S)—N(R$^1$)—, —N(R$^1$)—C(O)—S—, —S—C(O)—N(R$^1$)—, —(R$^1$)N—C(O)—N(R$^1$)—, or —(R$^1$)N—C(S)—N(R$^1$)—; R$^1$ is hydrogen, alkyl, aryl, arylalkylenyl, or alkylarylenyl; and Z is hydrogen, alkyl, aryl, arylalkylenyl, alkylarylenyl, heterocyclyl, or heterocyclylalkylenyl, wherein alkyl, aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of alkyl, heterocyclyl, and heterocyclylalkylenyl, oxo. When Y is —S—, Z is other than hydrogen.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility, but may be swellable in the presence of an appropriate solvent.

The term "polymer or polymeric" will be understood to include polymers, copolymers (e.g., polymers formed using two or more different monomers), oligomers or monomers that can form polymers, and combinations thereof, as well as polymers, oligomers, monomers, or copolymers that can be blended.

"Alkyl group" and the prefix "alk-" are inclusive of both straight chain and branched chain groups and of cyclic groups. In some embodiments, alkyl groups have up to 30 carbons (in some embodiments, up to 20, 15, 12, 10, 8, 7, 6, or 5 carbons) unless otherwise specified. Cyclic groups can be monocyclic or polycyclic and, in some embodiments, have from 3 to 10 ring carbon atoms. Terminal "alkenyl" groups have at least 3 carbon atoms.

"Alkylene" is the multivalent (e.g., divalent or trivalent) form of the "alkyl" groups defined above.

"Arylalkylene" refers to an "alkylene" moiety to which an aryl group is attached. "Alkylarylene" refers to an "arylene" moiety to which an alkyl group is attached.

The terms "aryl" and "arylene" as used herein include carbocyclic aromatic rings or ring systems, for example, having 1, 2, or 3 rings and optionally containing at least one heteroatom (e.g., O, S, or N) in the ring. Unless otherwise specified, aryl groups may have up to five substituents independently selected from the group consisting of alkyl groups having up to 4 carbon atoms (e.g., methyl or ethyl), alkoxy having up to 4 carbon atoms, halo (i.e., fluoro, chloro, bromo or iodo), hydroxy, or nitro groups. Examples of aryl groups include phenyl, naphthyl, biphenyl, fluorenyl as well as furyl, thienyl, pyridyl, quinolinyl, isoquinolinyl, indolyl, isoindolyl, triazolyl, pyrrolyl, tetrazolyl, imidazolyl, pyrazolyl, oxazolyl, and thiazolyl.

The term "heterocyclyl" includes non-aromatic rings or ring systems that contain at least one ring heteroatom (e.g., O, S, N). The heterocyclyl group may include 1, 2, or 3 rings and includes all of the fully saturated and partially unsaturated derivatives of the above mentioned aryl groups having at least one heteroatom.

All numerical ranges are inclusive of their endpoints and non-integral values between the endpoints unless otherwise stated (e.g., 1 to 5 includes 1, 1.5, 2, 2.75, 3, 3.80, 4, 5, etc.).

DETAILED DESCRIPTION

In some embodiments, the dye is represented by formula:

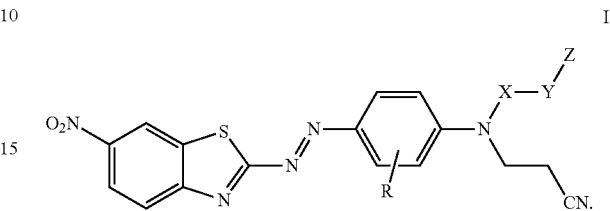

I

In formula I, R is hydrogen or alkyl. In some embodiments, R is hydrogen or alkyl having 1 to 4 carbon atoms (e.g., methyl, ethyl, n-propyl, isopropyl, n-butyl, isobutyl, or sec-butyl). In some embodiments, R is hydrogen.

In formula I, X is alkylene optionally interrupted by at least one —O— group (i.e., ether). The phrase "interrupted by at least one —O— group" refers to having part of the alkylene on either side of the —O— group. An example of an alkylene interrupted by an —O— is —$CH_2$—$CH_2$—O—$CH_2$—$CH_2$—. An example of an alkylene interrupted by more than one —O— is —$CH_2$—$CH_2$—O—$CH_2$—$CH_2$—O—$CH_2$—$CH_2$—. In some embodiments, X is alkylene, in some embodiments, having from 1 to 6 or 2 to 6 carbon atoms. In some embodiments, X is —$CH_2$—$CH_2$—.

In formula I, Y is a bond, ether (i.e., —O—), thioether (i.e., —S—), amine (i.e., —$NR^1$—), amide (i.e., —$N(R^1)$—C(O)— or —C(O)—$N(R^1)$—), ester (i.e., —O—C(O)— or —C(O)—O—), thioester (i.e., —S—C(O)—, —C(O)—S—, —O—C(S)—, —C(S)—O—), carbonate (i.e., —O—C(O)—O—), thiocarbonate (i.e., —S—C(O)—O— or —O—C(O)—S—), carbamate (i.e., —$(R^1)$N—C(O)—O— or —O—C(O)—$N(R^1)$—), thiocarbamate (i.e., —$N(R^1)$—C(O)—S—, —S—C(O)—$N(R^1)$—, —$N(R^1)$—C(S)—O—, —O—C(S)—$N(R^1)$—), urea (i.e., —$(R^1)$N—C(O)—N$(R^1)$—), or thiourea (i.e., —$(R^1)$N—C(S)—N$(R^1)$—). In some embodiments, Y is a bond, —O—, —S—, —$NR^1$—, —$N(R^1)$—C(O)—, —O—C(O)—, —O—C(O)—O—, —$(R^1)$N—C(O)—O—, —O—C(O)—$N(R^1)$—, or —$(R^1)$N—C(O)—$N(R^1)$—. In some embodiments, Y is —O—C(O)— or —O—C(O)—$NR^1$—. In any of these groups that include an $R^1$, $R^1$ is hydrogen, alkyl, aryl, arylalkylenyl, or alkylarylenyl. In some embodiments, $R^1$ is hydrogen or alkyl, for example, having 1 to 4 carbon atoms (e.g., methyl, ethyl, n-propyl, isopropyl, n-butyl, isobutyl, or sec-butyl). In some embodiments, $R^1$ is methyl or hydrogen. In some embodiments, Y is —O—C(O)—. In some embodiments, Y is a bond. It should be understood that when Y is a bond, Z is bonded directly to X. In other words, Y is absent from formula I.

In formula I, Z is hydrogen, alkyl, aryl, arylalkylenyl, alkylarylenyl, heterocyclyl, or heterocyclylalkylenyl, wherein alkyl, aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of alkyl, heterocyclyl, and heterocyclylalkylenyl, oxo. When Y is —S—, Z is other than hydrogen. It should be understood that Z is not a polymerizable group, for example, that can undergo free-radical initiated polymerization. A person skilled in the art will recognize that Z does not include, for example, a styrenyl group, a terminal alkenyl (e.g., allyl or vinyl group), or a mercaptan. Thus, the dye is not expected to become incorporated into the polymer network through covalent bonding. In the at least partially crosslinked network, Z is not covalently bonded in the network. In some embodiments, Z is hydrogen, alkyl, aryl, or arylalkylenyl, wherein alkyl, aryl, and arylalkylenyl are unsubstituted or substituted by at least one substituent selected from the group consisting of alkyl, alkoxy, hydroxyalkyl, halogen, or hydroxyl. In some embodiments, Z is hydrogen or alkyl. In some embodiments, Z is alkyl having one to six or one to four carbon atoms.

Some compounds of formula I are commercially available. For example, a compound of formula X

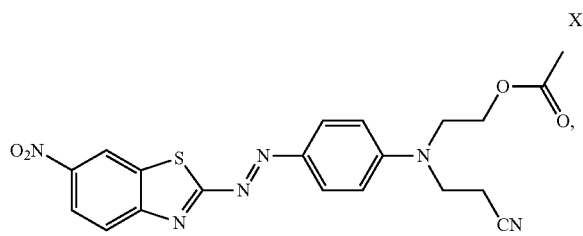 [SMILES: CC(=O)OCCN(CCC#N)c1ccc(/N=N/c2nc3ccc([N+](=O)[O-])cc3s2)cc1]

X (acetic acid 2-{(2-cyano-ethyl)-[4-(6-nitro-benzothiazol-2-ylazo)-phenyl]-amino}-ethyl ester) is commercially available, for example, from Orichem International Ltd, Hangzhou, China, under the trade designation of "DISPERSE RED 177". Other compounds of formula I can be prepared by conventional methods.

For example, the compound of formula X can be hydrolyzed under conventional saponification conditions to provide the hydroxyl-substituted compound. Alternatively, hydroxyl-substituted compounds can be prepared by treating commercially available 2-amino-6-nitrobenzothiazole with nitrosyl sulfuric acid solution prepared in situ from sodium nitrite in concentrated sulfuric acid according to the method described in Cojocariu, C., et al. *J. Mater. Chem.*, 2004, vol. 14, pages 2909-2916. The reaction can conveniently be carried out in a mixture of dichloroacetic acid and glacial acetic acid after cooling below room temperature. The resultant diazonium sulfate salt can be coupled with N-(2-cyanoethyl)-N-(2-hydroxyethyl)aniline. Other alkyl-substituted N-(2-cyanoethyl)-N-(2-hydroxyalkyl)-anilines, which can be prepared by known methods, can also be useful in the coupling reaction. The resultant hydroxyl-substituted compounds are represented by the following formula XI:

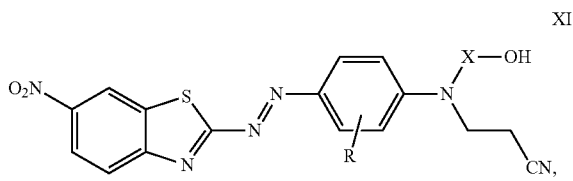

XI in which X and R are defined as in any of their embodiments described above.

Hydroxyl-substituted compounds of formula XI can be converted to other compounds of formula I using a variety of known synthetic methods. For example, the hydroxyl-group on the compound of formula XI can be converted to an ester using an acid chloride in the presence of a base to provide a compound of formula I in which Y is —O—C(O)—, and Z is as defined above in any of its embodiments. A wide variety of acid chlorides (e.g., substituted or unsubstituted alkyl, aryl, arylalkylenyl, alkylarylenyl, heterocyclyl, or heterocyclylalkylenyl) are commercially available and may be useful in this reaction. Other esterification methods using carboxylic acids or equivalents thereof may also be useful. The hydroxyl group in the compound of formula XI can also be reacted with a substituted or unsubstituted benzoic acid or an equivalent thereof under Mitsunobu reaction conditions to provide a compound in which Y is —O—C(O)— and Z is a phenyl or substituted phenyl. Conveniently the Mitsunobu coupling is carried out in the presence of triphenyl phosphine and diisopropyl azodicarboxylate or diethyl azodicarboxylate in a suitable solvent. The reaction can conveniently be carried out at or below ambient temperature. Compounds of formula XI can also be treated with an isocyanate or isothiocyanate to provide compounds of formula I in which Y is a —O—C(O)—NR$^1$— or a —O—C(S)—NR$^1$—, and Z and R$^1$ are as defined above in any of their embodiments. A wide variety of isocyanates and isothiocyanates (e.g., substituted or unsubstituted alkyl, aryl, arylalkylenyl, alkylarylenyl, heterocyclyl, or heterocyclylalkylenyl) are commercially available and may be useful in this reaction. Such reactions can be carried out in the presence of tin compounds (e.g., dibutyltin dilaurate) at ambient temperature. The hydroxyl group in compounds of formula XI can also be converted to an amine or thiol using standard functional group manipulation. The resultant amines or mercaptans can be reacted with carboxylic acids and equivalents thereof, isocyanates, and isothiocyanates using known chemistry to provide a variety of Y and Z groups in the compounds of formula I.

In some embodiments, compositions according to the present disclosure in any of the embodiments described above and below include the compound of formula I in an amount from 0.1 percent to 0.00001 percent by weight, based on the total weight of the curable composition. In some embodiments, the compound of formula I is included in the composition in an amount from 0.05 percent to 0.00001 percent, from 0.04 percent to 0.0001 percent, or 0.02 percent to 0.0001 percent by weight, based on the total weight of the curable composition.

A variety of polythiols and unsaturated compounds comprising more than one carbon-carbon double bond, carbon-carbon triple bond, or a combination thereof may be useful in the compositions according to the present disclosure. In some embodiments, the polythiol is monomeric. In these embodiments, the polythiol may be an alkylene, arylene, alkylarylene, arylalkylene, or alkylenearylalkylene having more than one mercaptan group, wherein any of the alkylene, alkylarylene, arylalkylene, or alkylenearylalkylene are optionally interrupted by one or more ether (i.e., —O—), thioether (i.e., —S—), or amine (i.e., —NR$^1$—) groups and optionally substituted by alkoxy or hydroxyl. Useful monomeric polythiols may be dithiols or polythiols with more than 2 (in some embodiments, 3 or 4) mercaptan groups. In some embodiments, the polythiol is an alkylene dithiol in which the alkylene is optionally interrupted by one or more ether (i.e., —O—) or thioether (i.e., —S—) groups. Examples of useful dithiols include 1,2-ethanedithiol, 1,2-propanedithiol, 1,3-propanedithiol, 1,3-butanedithiol, 1,4- butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane and mixtures thereof. Polythiols having more than two mercaptan groups include propane-1,2,3-trithiol; 1,2-bis[(2-mercaptoethyl)thio]-3-mercaptopropane; tetrakis(7-mercapto-2,5-dithiaheptyl)methane; and trithiocyanuric acid. Combinations of any of these or with any of the dithiols mentioned above may be useful.

It should be understood that the unsaturated compound having carbon-carbon double bonds and/or carbon-carbon triple bonds are reactive and generally not part of an aromatic ring. In some of these embodiments, the carbon-carbon double and triple bonds are terminal groups in a linear aliphatic compound. However, styryl groups and allyl-substituted aromatic rings may be useful. The unsaturated compound may also include one or more ether (i.e., —O—), thioether (i.e., —S—), amine (i.e., —NR$^1$—), or ester (e.g., so that the compound is an acrylate or methacrylate) groups and one or more alkoxy or hydroxyl substituents. Suitable unsaturated compounds include dienes, diynes, divinyl ethers, diallyl ethers, ene-ynes, and trifunctional versions of any of these. Combinations of any of these groups may also be useful.

Examples of suitable vinyl ethers having two or more vinyl ether groups include divinyl ether, ethylene glycol divinyl ether, butanediol divinyl ether, hexanediol divinyl ether, diethylene glycol divinyl ether, triethylene glycol divinyl ether, tetraethylene glycol divinyl ether, cyclohexanedimethanol divinyl ether, polytetrahydrofuryl divinyl ether, trimethylolpropane trivinyl ether, pentaerythritol tetravinyl ether, and combinations of any of these. Useful divinyl ethers of formula $CH_2$=CH—O—(—R$^2$—O—)$_m$—CH=$CH_2$, in which R$^2$ is $C_2$ to $C_6$ branched alkylene can be prepared by reacting a polyhydroxy compound with acetylene. Examples of compounds of this type include compounds in which R$^2$ is an alkyl-substituted methylene group such as —CH($CH_3$)— (e.g., those obtained from BASF, Florham Park, N.J., under the trade designation "PLURIOL", for which R$^2$ is ethylene and m is 3.8) or an alkyl-substituted ethylene (e.g., —$CH_2$CH($CH_3$)— such as those obtained from International Specialty Products of Wayne, N.J., under the trade designation "DPE" (e.g., "DPE-2" and "DPE-3").

Other suitable examples of unsaturated compounds having more than one carbon-carbon double bond or carbon-carbon triple bond include triallyl-1,3,5-triazine-2,4,6-trione, 2,4,6-triallyloxy-1,3,5-triazine, 4-vinyl-1-cyclohexene, 1,5-cyclooctadiene, 1,6-heptadiyne, 1,7-octadiyne, and diallyl phthalate. When using polythiols having two thiol groups, a mixture of unsaturated compounds may be useful in which at least one unsaturated compound has two carbon-carbon double or triple bonds, and at least one unsaturated compound has at least three carbon-carbon double or triple bonds. Mixtures of unsaturated compounds having at least 5 percent functional equivalents of carbon-carbon double or triple bonds contributed by polyenes having at least three carbon-carbon double or triple bonds may be useful.

Typically the amounts of the polythiol(s) and unsaturated compound(s) are selected for the curable composition so that there is a stoichiometric equivalence of mercaptan groups and carbon-carbon double and triple bonds.

In some embodiments, the polythiol in the curable composition according to the present disclosure is oligomeric or polymeric. Examples of useful oligomeric or polymeric polythiols include polythioethers and polysulfides. Polythioethers include thioether linkages (i.e., —S—) in their backbone structures. Polysulfides include disulfides linkages (i.e., —S—S—) in their backbone structures.

Polythioethers can be prepared, for example, by reacting dithiols with dienes, diynes, divinyl ethers, diallyl ethers, ene-ynes, or combinations of these under free-radical conditions. Useful reagents for making polythioethers include any of the dithiols, dienes, diynes, divinyl ethers, diallyl ethers, and ene-ynes listed above. Examples of useful polythioethers are described, for example, in U.S. Pat. No. 4,366,307 (Singh et al.), U.S. Pat. No. 4,609,762 (Morris et al.), U.S. Pat. No. 5,225,472 (Cameron et al.), U.S. Pat. No. 5,912,319 (Zook et al.), U.S. Pat. No. 5,959,071 (DeMoss et al.), U.S. Pat. No. 6,172,179 (Zook et al.), and U.S. Pat. No. 6,509,418 (Zook et al.). In some embodiments, the polythioether is represented by formula HS—R$^3$—[S—($CH_2$)$_2$—O—[—R$^4$—O—]$_m$—($CH_2$)$_2$—S—R$^3$—]$_n$—SH, wherein each R$^3$ and R$^4$ is independently a $C_{2-6}$ alkylene, which may be straight-chain or branched, $C_{6-8}$ cycloalkylene, $C_{6-10}$ alkylcycloalkylene, —[($CH_2$-)$_p$—X—]$_q$—(—$CH_2$—)$_r$, in which at least one —$CH_2$— is optionally substituted with a methyl group, X is one selected from the group consisting of O, S and —NR$^5$—, R$^5$ denotes hydrogen or methyl, m is a number from 0 to 10, n is a number from 1 to 60, p is a number from 2 to 6, q is a number from 1 to 5, and r is a number from 2 to 10. Polythioethers with more than two mercaptan groups may also be useful. Any of the free-radical initiators and methods described below in connection with at least partially curing the compositions disclosed herein may also be useful for preparing the polythioethers. In some embodiments, a thermal free-radical initiator described below is combined with the dithiols and dienes, diynes, divinyl ethers, diallyl ethers, ene-ynes, or combinations of these, and the resulting mixture is heated to provide the polythioethers.

Polythioethers can also be prepared, for example, by reacting dithiols with diepoxides, which may be carried out by stirring at room temperature, optionally in the presence of a tertiary amine catalyst (e.g., 1,4-diazabicyclo[2.2.2]octane (DABCO)). Useful dithiols include any of those described above. Useful epoxides can be any of those having two epoxide groups. In some embodiments, the diepoxide is a bisphenol diglycidyl ether, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Polythioethers prepared from dithiols and diepoxides have pendent hydroxyl groups and can have structural repeating units represented by formula —S—R$^3$—S—$CH_2$—CH(OH)—$CH_2$—O—$C_6H_5$—$CH_2$—$C_6H_5$—O—$CH_2$—CH(OH)—$CH_2$—S—R$^3$—S—, wherein R$^3$ is as defined above, and the bisphenol unit (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. Mercaptan terminated polythioethers of this type can then optionally be reacted with any of the dienes, diynes, divinyl ethers, diallyl ethers, and ene-ynes listed above under free radical conditions. Any of the free-radical initiators and methods described below in connection with at least partially curing the composition disclosed herein may also be useful for preparing the polythioethers. In some embodiments, a thermal initiator described below is used, and the resulting mixture is heated to provide the polythioether.

The polythioethers may also be terminated with carbon-carbon double bonds, depending on the stoichiometry of the reaction. In these embodiments, the polythioethers can serve as the unsaturated compound having at least two carbon-carbon double bonds.

Polysulfides are typically prepared by the condensation of sodium polysulfide with bis-(2-chloroethyl) formal, which provides linear polysulfides having two terminal mercaptan groups. Branched polysulfides having three or more mercaptan groups can be prepared using trichloropropane in the reaction mixture. Examples of useful polysulfides are described, for example, in U.S. Pat. No. 2,466,963 (Patrick et al); U.S. Pat. No. 2,789,958 (Fettes et al); U.S. Pat. No. 4,165,425 (Bertozzi); and U.S. Pat. No. 5,610,243 (Vietti et al.). Polysulfides are commercially available under the trademarks "THIOKOL" and "LP" from Toray Fine Chemicals Co., Ltd., Urayasu, Japan and are exemplified by grades "LP-2", "LP-2C" (branched), "LP-3", "LP-33", and "LP-541".

Polythioethers and polysulfides can have a variety of useful molecular weights. In some embodiments, the polythioethers and polysulfides have number average molecular weights in a range from 500 grams per mole to 20,000 grams per mole, 1,000 grams per mole to 10,000 grams per mole, or 2,000 grams per mole to 5,000 grams per mole.

The polythioethers and polysulfides that are mercaptan-terminated may be combined with any of the unsaturated compounds including more than one carbon-carbon double or triple bonds described above using any of the free-radical initiators and methods described below to provide a cured composition according to the present disclosure.

The compositions according to the present disclosure can be at least partially cured using free-radical polymerization. Accordingly, compositions according to the present disclosure typically include a free-radical initiator. Any free-radical initiator may be useful. Examples of suitable free-radical initiators include azo compounds (e.g., 2,2'-azobisisobutyronitrile (AIBN), 2,2'-azobis(2-methylbutyronitrile), or azo-2-cyanovaleric acid). In some embodiments, the free-radical initiator is an organic peroxide. Examples of useful organic peroxides include hydroperoxides (e.g., cumene, tert-butyl or tert-amyl hydroperoxide), dialkyl peroxides (e.g., di-tert-butylperoxide, dicumylperoxide, or cyclohexyl peroxide), peroxyesters (e.g., tert-butyl perbenzoate, tert-butyl peroxy-2-ethylhexanoate, tert-butyl peroxy-3,5,5-trimethylhexanoate, tert-butyl monoperoxymaleate, or di-tert-butyl peroxyphthalate), peroxycarbonates (e.g., tert-butylperoxy 2-ethylhexylcarbonate, tert-butylperoxy isopropyl carbonate, or di(4-tert-butylcyclohexyl) peroxydicarbonate), ketone peroxides (e.g., methyl ethyl ketone peroxide, 1,1-di(tert-butylperoxy)cyclohexane, 1,1-di(tert-butylperoxy)-3,3,5-trimethylcyclohexane, and cyclohexanone peroxide), and diacylperoxides (e.g., benzoyl peroxide or lauryl peroxide). The organic peroxide may be selected, for example, based on the temperature desired for use of the organic peroxide and compatibility with the curable composition. Combinations of two or more organic peroxides may also be useful.

The free-radical initiator may also be a photoinitiator. Examples of useful photoinitiators include benzoin ethers (e.g., benzoin methyl ether or benzoin butyl ether); acetophenone derivatives (e.g., 2,2-dimethoxy-2-phenylacetophenone or 2,2-diethoxyacetophenone); 1-hydroxycyclohexyl phenyl ketone; and acylphosphine oxide derivatives and acylphosphonate derivatives (e.g., bis(2,4,6-trimethylbenzoyl)phenylphosphine oxide, diphenyl-2,4,6-trimethylbenzoylphosphine oxide, isopropoxyphenyl-2,4,6-trimethylbenzoylphosphine oxide, or dimethyl pivaloylphosphonate). Many photoinitiators are available, for example, from BASF under the trade designation "IRGACURE". The photoinitiator may be selected, for example, based on the desired wavelength for curing and compatibility with the curable composition. When using a photoinitiator, the composition is typically curable using an actinic light source.

The compositions according to the present disclosure in any of their embodiments described above and below can be heated or exposed to light for a sufficient time to at least partially cure the composition. The method of making an at least partially crosslinked network according to the present disclosure includes providing a curable composition comprising a polythiol; at least one unsaturated compound comprising more than one carbon-carbon double bond, carbon-carbon triple bond, or a combination thereof; and a dye compound represented by formula I. The method further includes subsequently at least one of exposing the composition to light or allowing the composition to achieve a temperature sufficient for a thermal free radical initiator to at least partially cure the composition. In some embodiments, the method of making a polymer network includes exposing the composition disclosed herein in any of its embodiments to light. The light source and exposure time can be selected, for example, based on the nature and amount of the composition. Sources of ultraviolet and/or visible light can be useful (for example, wavelengths ranging from about 200 nm to about 650 nm, from about 315 nm to 550 nm, or from about 315 nm to 500 nm can be useful). Suitable light includes sunlight and light from artificial sources, including both point sources and flat radiators. In some embodiments, the composition is curable using a blue light source. In some embodiments, the composition is curable using a UV light source.

Examples of useful light sources include carbon arc lamps; xenon arc lamps; medium-pressure, high-pressure, and low-pressure mercury lamps, doped if desired with metal halides (metal halogen lamps); microwave-stimulated metal vapor lamps; excimer lamps; superactinic fluorescent tubes; fluorescent lamps; incandescent argon lamps; electronic flashlights; xenon flashlights; photographic flood lamps; light-emitting diodes; laser light sources (for example, excimer lasers); and combinations thereof. The distance between the light source and the curable composition can vary widely, depending upon the particular application and the type and/or power of the light source. For example, distances up to about 150 cm, distances from about 0.01 cm to 150 cm, or a distance as close as possible without touching the composition can be useful.

For any of the embodiments of the methods according to the present disclosure, exposing the composition to light at least partially cures the composition. The phrase "at least partially cured or crosslinked" includes the state where the molecular weight of the polymer network has increased via the formation of covalent bonds but before the overall system reaches the gelation point. Partially crosslinked polymers may have a measurable intrinsic viscosity in an appropriate solvent, as determined, for example, in accordance with ASTM Methods D1243, D1795, D2857, D4243 or D4603. Fully cured or crosslinked polymers will have an intrinsic viscosity too high to measure. The phrase "at least partially cured" encompasses partially crosslinked or cured polymer networks, polymer networks that have reached the gelation point, and fully cured compositions.

Crosslinked networks prepared with polythiols and compounds having two or more carbon-carbon double bonds, carbon-carbon triple bonds, or a combination thereof as described above in any of their embodiments are useful for a variety of applications. For example, such crosslinked networks can be useful as sealants, for example, aviation fuel resistant sealants. Aviation fuel resistant sealants are widely used by the aircraft industry for many purposes. Principal among these uses are the sealing of integral fuel tanks and cavities, the sealing of the passenger cabin to maintain pressurization at high altitude, and for the aerodynamic smoothing of the aircraft's outer surfaces. Compositions according to the present disclosure may be useful in these applications, for example, because of their fuel resistance and low glass transition temperatures.

When used in sealant applications, for example, compositions according to the present disclosure can also contain fillers. Conventional inorganic fillers such as silica (e.g., fumed silica), calcium carbonate, aluminum silicate, and carbon black may be useful as well as low density fillers. In some embodiments, the composition according to the present disclosure includes at least one of silica, hollow ceramic elements, hollow polymeric elements, calcium silicates, calcium carbonate, or carbon black. Silica, for example, can be of any desired size, including particles having an average size above 1 micrometer, between 100 nanometers and 1 micrometer, and below 100 nanometers. Silica can include nanosilica and amorphous fumed silica, for example. Suitable low density fillers may have a specific gravity ranging from about 1.0 to about 2.2 and are exemplified by calcium silicates, fumed silica, precipitated silica, and polyethylene. Examples include calcium silicate having a specific gravity of from 2.1 to 2.2 and a particle size of from 3 to 4 microns ("HUBERSORB HS-600", J. M. Huber Corp.) and fumed silica having a specific gravity of 1.7 to 1.8 with a particle size less than 1 ("CAB-O-SIL TS-720", Cabot Corp.). Other examples include precipitated silica having a specific gravity of from 2 to 2.1 ("HI-SIL TS-7000", PPG Industries), and polyethylene having a specific gravity of from 1 to 1.1 and a particle size of from 10 to 20 microns ("SHAMROCK S-395" Shamrock Technologies Inc.). The term "ceramic" refers to glasses, crystalline ceramics, glass-ceramics, and combinations thereof. Hollow ceramic elements can include hollow spheres and spheroids among other shapes. The hollow ceramic elements and hollow polymeric elements may have one of a variety of useful sizes but typically have a maximum dimension of less than 1 millimeter (mm). The specific gravities of the microspheres range from about 0.1 to 0.7 and are exemplified by polystyrene foam, microspheres of polyacrylates and polyolefins, and silica microspheres having particle sizes ranging from 5 to 100 microns and a specific gravity of 0.25 ("ECCOSPHERES", W. R. Grace & Co.). Other examples include elastomeric particles available, for example, from Akzo Nobel, Amsterdam, The Netherlands, under the trade designation "EXPANCEL". Yet other examples include alumina/silica microspheres having particle sizes in the range of 5 to 300 microns and a specific gravity of 0.7 ("FILLITE", Pluess-Stauffer International), aluminum silicate microspheres having a specific gravity of from about 0.45 to about 0.7 ("Z-LIGHT"), and calcium carbonate-coated polyvinylidene copolymer microspheres having a specific gravity of 0.13 ("DUALITE 6001AE", Pierce & Stevens Corp.). Further examples of commercially available materials suitable for use as hollow, ceramic elements include glass bubbles marketed by 3M Company, Saint Paul, Minn., as "3M GLASS BUBBLES" in grades K1, K15, K20, K25, K37, K46, S15, S22, S32, S35, S38, S38HS, S38XHS, S42HS, S42XHS, S60, S60HS, iM30K, iM16K, XLD3000, XLD6000, and G-65, and any of the HGS series of "3M GLASS BUBBLES"; glass bubbles marketed by Potters Industries, Carlstadt, N.J., under the trade designations "Q-CEL HOLLOW SPHERES" (e.g., grades 30, 6014, 6019, 6028, 6036, 6042, 6048, 5019, 5023, and 5028); and hollow glass particles marketed by Silbrico Corp., Hodgkins, Ill. under the trade designation "SILCELL" (e.g., grades SIL 35/34, SIL-32, SIL-42, and SIL-43). Such fillers, alone or in combination, can be present in a sealant in a range from 10 percent by weight to 55 percent by weight, in some embodiments, 20 percent by weight to 50 percent by weight, based on the total weight of the sealant composition.

When used in sealant applications, for example, compositions according to the present disclosure can also contain at least one of cure accelerators, surfactants, adhesion promoters, thixotropic agents, and solvents.

Sealants may optionally be used in combination with a seal cap, for example, over rivets, bolts, or other types of fasteners. A seal cap may be made using a seal cap mold, filled with a curable sealant, and placed over a fastener. The curable sealant may then be cured. In some embodiments, the seal cap and the curable sealant may be made from the same material. In some embodiments, the seal cap may be made from a curable composition disclosed herein. For more details regarding seal caps, see, for example, Int. Pat. Appl. Pub. No. WO2014/172305 (Zook et al.).

The dye compounds of formula I can be useful for indicating curing in the compositions according to the present disclosure. The compounds of formula I changes color in the presence of free-radicals, and thus can directly indicate cure by correlation of the concentration of free-radicals in the system. Compounds of formula I have an initial colored state and a less colored or colorless final state, as demonstrated in the examples, below.

Accordingly, the present disclosure also provides a method for indicating curing in a curable polymeric resin, including any of the curable polymeric resins described above. The method includes providing a composition comprising a curable polymeric resin, a free-radical initiator, and a compound of formula I in an amount sufficient to provide the composition with a first absorbance at a wavelength in a range from 400 nanometers to 700 nanometers. The wavelength may in a range, for example, from 450 nanometers to 650 nanometers, typically in a range from 500 nanometers to 550 nanometers. Allowing the composition to cure or curing the composition provides a cured composition that has a second absorbance at the wavelength that is different from the first absorbance. In some embodiments, the absorbance at the selected wavelength is decreased by at least 20, 25, 30, 35, 40, 45, or 50 percent or more. The initial and final absorbance can be measured, for example, using a UV/VIS spectrometer or a colorimeter. A composition having an absorbance at a wavelength in a range from 400 nanometers to 700 nanometers would typically be perceived by the human eye as a particular color. In some embodiments, a color in the composition is no longer visible in the cured composition. In these embodiments, a difference between the second absorbance and the first absorbance is visually determined. In some embodiments, providing the composition includes mixing the curable polymeric resin with a free-radical initiator and the compound of formula I. The free-radical initiator may be any of those described above.

Mixing can be carried out until the visible color is uniformly dispersed in the composition, which may be useful in higher viscosity compositions.

In compositions that are light cured, the compositions according to the present disclosure also provide the advantage that they can indicate when they have been exposed to a curing light. In these cases, the disappearance or muting of the color can indicate that the compositions have been exposed to the curing light. The color change in the presently disclosed compositions indicates that free radicals have been generated. This feature can be beneficial when a manufacturing line has been stopped, for example, so that operators can easily differentiate exposed and unexposed compositions.

As shown in the Examples, below, while compositions that include certain photoinitiators can change color upon curing, there is typically a more visible color change when the dye compounds represented by formula I are present. For example, as shown in Table 2, below, compositions without the dye compound represented by formula I show low ΔE values (e.g, in a range from 15 to 20) after curing in comparison to before curing because the photoinitiator obtained from BASF under the trade designation "IRGA-CURE 819" bleaches color from yellow to colorless after exposure of the light. In contrast, Examples 1 and 2, which include the dye compound of formula I, show a higher ΔE value (e.g., typically greater than 30) after curing in comparison to before curing. The change from red to colorless upon curing of the compositions of the present disclosure provides an easily visible indication of curing.

Existing sealant products now in use in the aircraft industry are typically either two-part products or one-part products. For the two-part products, once the user mixes the two parts, the reaction begins and the sealant starts to form into an elastomeric solid. After mixing, the time that the sealant remains usable is called the application life. Throughout the application life, viscosity of the sealant gradually increases until the sealant is too viscous to be applied. Application life and cure time are typically related in that short application life products cure quickly. Conversely, long application life products cure slowly. In practice, customers choose products with differing application lives and cure times depending on the specific application. This requires the customer to maintain inventories of multiple products to address the production flow requirements of building and repairing aircraft. For one-part products, users can avoid a complicated mixing step, but the product has to be shipped and stored in a freezer before application. Advantageously, in many embodiments, compositions according to the present disclosure can be useful as one-part sealants that can simultaneously have a long application life but can be cured on demand.

As shown in the Examples below, compositions according to the present disclosure, which include a dye compound of formula I, are useful for preventing an increase in viscosity that is associated with polymerization in the composition before curing is desired. As shown in Table 1, a composition that includes 1,8-dimercapto-3,6-dioxaoctane, diethylene glycol divinyl ether, and triallylcyanurate increases in dynamic viscosity over 49 days from about 0.003 to 0.005 Pa-s to 5 Pa-s. In Example 1, when a dye compound of formula I is added to an otherwise identical composition, an increase in dynamic viscosity over 49 days from about 0.003 to 0.005 Pa-s to 0.86 Pa-s was observed. Surprisingly, the stabilization provided by the dye compound of formula I is better than the stabilization provided by a conventional free-radical inhibitor p-methoxy phenol (MEHQ). As shown in Comparative Example B, when MEHQ is added to a composition that includes 1,8-dimercapto-3,6-dioxaoctane, diethylene glycol divinyl ether, and triallylcyanurate, the composition increased in dynamic viscosity over 49 days from about 0.003 to 0.005 Pa-s to 3.7 Pa-s.

For convenience, the compositions according to the present disclosure may also include a solvent. The solvent can be any material capable of dissolving the compound of formula I or another component of the composition (e.g., a free-radical initiator). In some embodiments, the dye compound may be added as a solid. In some embodiments, compositions according to the present disclosure are free of solvent.

Some Embodiments of the Disclosure

In a first embodiment, the present disclosure provides a curable composition comprising a polythiol; at least one unsaturated compound comprising more than one carbon-carbon double bond, carbon-carbon triple bond, or a combination thereof; and a dye compound represented by formula:

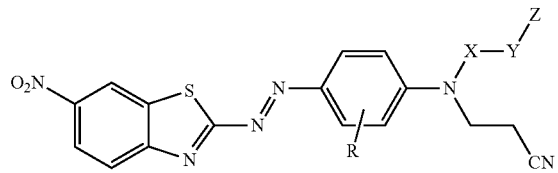

wherein
R is hydrogen or alkyl;
X is alkylene optionally interrupted by —O—;
Y is a bond, —O—, —S—, —NR$^1$—, —N(R$^1$)—C(O)—, —C(O)—N(R$^1$)—, —O—C(O)—, —C(O)—O—, —S—C(O)—, —C(O)—S—, —O—C(S)—, —C(S)—O—, —O—C(O)—O—, —S—C(O)—O—, —O—C(O)—S—, —(R$^1$)N—C(O)—O—, —O—C(O)—N(R$^1$)—, —(R$^1$)N—C(S)—O—, —O—C(S)—N(R$^1$)—, —N(R$^1$)—C(O)—S—, —S—C(O)—N(R$^1$)—, —(R$^1$)N—C(O)—N(R$^1$)—, or —(R$^1$)N—C(S)—N(R$^1$)—;
R$^1$ is hydrogen, alkyl, aryl, arylalkylenyl, or alkylarylenyl; and
Z is hydrogen, alkyl, aryl, arylalkylenyl, alkylarylenyl, heterocyclyl, or heterocyclylalkylenyl, wherein alkyl, aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of alkyl, heterocyclyl, and heterocyclylalkylenyl, oxo;
with the proviso that when Y is —S—, Z is other than hydrogen.

In a second embodiment, the present disclosure provides the curable composition of the first embodiment, wherein R is hydrogen.

In a third embodiment, the present disclosure provides the curable composition of the first or second embodiments, wherein Y is —O—C(O)— or —O—C(O)—NR$^1$—.

In a fourth embodiment, the present disclosure provides the curable composition of any one of the first to third embodiments, wherein X is alkylene.

In a fifth embodiment, the present disclosure provides the curable composition of the third or fourth, wherein Z is alkyl or aryl.

In a sixth embodiment, the present disclosure provides the curable composition of any one of the first to fifth embodiments, wherein —X—Y—Z is —CH$_2$CH$_2$—O—C(O)—CH$_3$.

In a seventh embodiment, the present disclosure provides the curable composition of any one of the first to sixth embodiments, wherein the polythiol is monomeric.

In an eighth embodiment, the present disclosure provides the curable composition of any one of the first to sixth embodiments, wherein the polythiol is oligomeric or polymeric.

In a ninth embodiment, the present disclosure provides the curable composition of the eighth embodiment, wherein the polythiol is a polythioether oligomer or polymer or a polysulfide oligomer or polymer.

In a tenth embodiment, the present disclosure provides the curable composition of the eighth embodiment, wherein the polythiol is a polythioether oligomer or polymer prepared from components comprising a dithiol and a diene or divinyl ether and optionally a trithiol, triene, or trivinyl ether.

In an eleventh embodiment, the present disclosure provides the curable composition of any one of the first to tenth embodiments, wherein the at least one unsaturated compound comprises two carbon-carbon double bonds, and wherein the curable composition further comprises a second unsaturated compound comprising three carbon-carbon double bonds.

In a twelfth embodiment, the present disclosure provides the curable composition of any one of the first to the eleventh embodiments, wherein the at least one unsaturated compound comprising more than one carbon-carbon double bond, carbon-carbon triple bond, or a combination thereof comprises at least one of a diene, a diyne, a divinyl ether, a diallyl ether, or an ene-yne.

In a thirteenth embodiment, the present disclosure provides the curable composition of any one of the first to twelfth embodiments, further comprising at least one of silica, carbon black, calcium carbonate, aluminum silicate, or lightweight particles having a density of up to 0.7 grams per cubic centimeter.

In a fourteenth embodiment, the present disclosure provides the curable composition of any one of the first to thirteenth embodiments, further comprising a free-radical initiator.

In a fifteenth embodiment, the present disclosure provides the curable composition of the fourteenth embodiment, wherein the free-radical initiator is a photoinitiator.

In a sixteenth embodiment, the present disclosure provides the curable composition of the fourteenth embodiments, wherein the free-radical initiator is a thermal initiator.

In a seventeenth embodiment, the present disclosure provides an at least partially crosslinked polymer network comprising:
a polythiol at least partially crosslinked with at least one unsaturated compound comprising more than one carbon-carbon double bond, carbon-carbon triple bond, or a combination thereof; and a dye compound represented by the following formula:

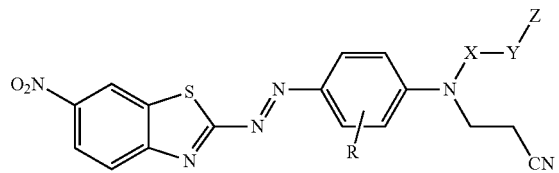

wherein
R is hydrogen or alkyl;
X is alkylene optionally interrupted by —O—;
Y is a bond, —O—, —S—, —NR$^1$—, —N(R$^1$)—C(O)—, —C(O)—N(R$^1$)—, —O—C(O)—, —C(O)—O—, —S—C(O)—, —C(O)—S—, —O—C(S)—, —C(S)—O—, —O—C(O)—O—, —S—C(O)—O—, —O—C(O)—S—, —(R$^1$)N—C(O)—O—, —O—C(O)—N(R$^1$)—, —(R$^1$)N—C(S)—O—, —O—C(S)—N(R$^1$)—, —N(R$^1$)—C(O)—S—, —S—C(O)—N(R$^1$)—, —(R$^1$)N—C(O)—N(R$^1$)—, or —(R$^1$)N—C(S)—N(R$^1$)—;
R$^1$ is hydrogen, alkyl, aryl, arylalkylenyl, or alkylarylenyl; and
Z is hydrogen, alkyl, aryl, arylalkylenyl, alkylarylenyl, heterocyclyl, or heterocyclylalkylenyl, wherein alkyl, aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of alkyl, heterocyclyl, and heterocyclylalkylenyl, oxo;
with the proviso that when Y is —S—, Z is other than hydrogen,
wherein the at least partially crosslinked polymer network is prepared from the curable composition according to any one of the first to sixteenth embodiments.

In an eighteenth embodiment, the present disclosure provides a sealant comprising the at least partially crosslinked polymer network of the seventeenth embodiment.

In a nineteenth embodiment, the present disclosure provides a method for indicating curing in a curable composition, the method comprising:
providing the curable composition of any one of the first to sixteenth embodiments, wherein the compound is present in the composition in an amount sufficient to provide the composition with a first absorbance at a wavelength in a range from 400 nanometers to 700 nanometers; and
allowing the composition to at least partially cure to provide an at least partially cured composition, wherein the at least partially cured composition has a second absorbance at the wavelength that is different from the first absorbance.

In a twentieth embodiment, the present disclosure provides the method of the nineteenth embodiment, wherein the difference between the first absorbance and the second absorbance is visually determined.

In a twenty-first embodiment, the present disclosure provides the method of the nineteenth or twentieth embodiment, wherein the curable composition is mixed until it is uniformly colored.

In a twenty-second embodiment, the present disclosure provides a method of stabilizing a curable composition comprising a polythiol and at least one unsaturated compound comprising more than one carbon-carbon double bond, carbon-carbon triple bond, or a combination thereof, the method comprising including in the composition a dye compound in an amount sufficient to reduce a viscosity increase of the curable composition relative to a comparative composition that is the same as the curable composition except that it does not contain the dye compound, wherein the dye compound is represented by formula:

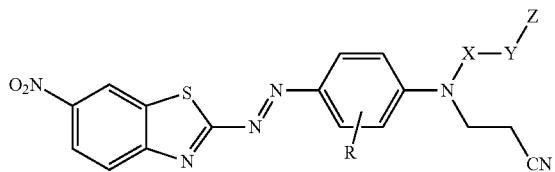

wherein
R is hydrogen or alkyl;
X is alkylene optionally interrupted by —O—;
Y is a bond, —O—, —S—, —NR$^1$—, —N(R$^1$)—C(O)—, —C(O)—N(R$^1$)—, —O—C(O)—, —C(O)—O—, —S—C(O)—, —C(O)—S—, —O—C(S)—, —C(S)—O—, —O—C(O)—O—, —S—C(O)—O—, —O—C(O)—S—, —(R$^1$)N—C(O)—O—, —O—C(O)—N(R$^1$)—, —(R$^1$)N—C(S)—O—, —O—C(S)—N(R$^1$)—, —N(R$^1$)—C(O)—S—, —S—C(O)—N(R$^1$)—, —(R$^1$)N—C(O)—N(R$^1$)—, or —(R$^1$)N—C(S)—N(R$^1$)—;
R$^1$ is hydrogen, alkyl, aryl, arylalkylenyl, or alkylarylenyl; and
Z is hydrogen, alkyl, aryl, arylalkylenyl, alkylarylenyl, heterocyclyl, or heterocyclylalkylenyl, wherein alkyl, aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of alkyl, heterocyclyl, and heterocyclylalkylenyl, oxo;
with the proviso that when Y is —S—, Z is other than hydrogen.

In a twenty-third embodiment, the present disclosure provides the method of the twenty-second embodiment, wherein R is hydrogen.

In a twenty-fourth embodiment, the present disclosure provides the method of the twenty-second or twenty-third embodiment, wherein Y is —O—C(O)— or —O—C(O)—NR$^1$—.

In a twenty-fifth embodiment, the present disclosure provides the method of the twenty-fourth embodiments, wherein Z is alkyl or aryl.

In a twenty-sixth embodiment, the present disclosure provides the method of any one of the twenty-second to twenty-fifth embodiments, wherein X is alkylene.

In a twenty-seventh embodiment, the present disclosure provides the method of any one of the twenty-second to twenty-sixth embodiments, wherein —X—Y—Z is —CH$_2$CH$_2$—O—C(O)—CH$_3$.

In a twenty-eighth embodiment, the present disclosure provides the method of any one of the twenty-second to twenty-seventh embodiments, wherein the composition further comprises a free-radical initiator.

In a twenty-ninth embodiment, the present disclosure provides the method of the twenty-eighth embodiments, wherein the free-radical initiator is a photoinitiator.

In a thirtieth embodiment, the present disclosure provides the method of the twenty-eighth embodiment, wherein the free-radical initiator is a thermal initiator.

In a thirty-first embodiment, the present disclosure provides the method of any one of the twenty-second to thirtieth embodiments, wherein the polythiol is monomeric.

In a thirty-second embodiment, the present disclosure provides the method of any one of the twenty-second to thirtieth embodiments, wherein the polythiol is oligomeric or polymeric.

In a thirty-third embodiment, the present disclosure provides the method of the thirty-second embodiment, wherein the polythiol is a polythioether oligomer or polymer or a polysulfide oligomer or polymer.

In a thirty-fourth embodiment, the present disclosure provides the method of the thirty-second embodiment, wherein the polythiol is a polythioether oligomer or polymer prepared from components comprising a dithiol and a diene or divinyl ether and optionally a trithiol, triene, or trivinyl ether.

In a thirty-fifth embodiment, the present disclosure provides the method of any one of the twenty-second to thirty-fourth embodiments, wherein the at least one unsaturated compound comprises two carbon-carbon double bonds, and wherein the curable composition further comprises a second unsaturated compound comprising three carbon-carbon double bonds.

In a thirty-sixth embodiment, the present disclosure provides the method of any one of the twenty-second to thirty-fifth embodiments, wherein the at least one unsaturated compound comprising more than one carbon-carbon double bond, carbon-carbon triple bond, or a combination thereof comprises at least one of a diene, a diyne, a divinyl ether, a diallyl ether, or an ene-yne.

In a thirty-seventh embodiment, the present disclosure provides the method of any one of the twenty-second to thirty-sixth embodiments, wherein the composition further comprises at least one of silica, carbon black, calcium carbonate, aluminum silicate, or lightweight particles having a density of up to 0.7 grams per cubic centimeter.

In a thirty-eighth embodiment, the present disclosure provides the method of any one of the twenty-second to thirty-seventh embodiments, wherein the dye compound is mixed in the curable composition until the curable composition is uniformly colored.

In a thirty-ninth embodiment, the present disclosure provides a method of making an at least partially crosslinked polymer network, the method comprising
providing the composition of the fourteenth embodiment; and at least one of:
exposing the composition to light to at least partially cure the composition; or
allowing the composition to achieve a temperature sufficient to at least partially cure the composition.

In a fortieth embodiment, the present disclosure provides the method of the thirty-ninth embodiment, wherein the composition includes a photoinitiator, and the method comprises exposing the composition to light to at least partially cure at least a portion of the composition.

In a forty-first embodiment, the present disclosure provides the method of the thirty-ninth or fortieth embodiment, wherein the light comprises at least one of ultraviolet light or blue light.

In a forty-second embodiment, the present disclosure provides the method of the forty-first embodiment, wherein the light comprises blue light.

In a forty-third embodiment, the present disclosure provides the method of any one of the thirty-ninth to forty-second embodiments, wherein exposing the composition to light to at least partially cure the composition comprises at least partially gelling the composition.

In a forty-fourth embodiment, the present disclosure provides the method of any one of the thirty-ninth to forty-second embodiments, wherein exposing the composition to light to at least partially cure the composition comprises fully curing the composition.

In order that this disclosure can be more fully understood, the following examples are set forth. It should be understood that these examples are for illustrative purposes only, and are not to be construed as limiting this disclosure in any manner.

EXAMPLES

The following abbreviations are used to describe the examples:
° C.: degrees Centigrade
mg: milligram
mL: milliliter
μL: microliter
Pa: Pascal
Pa·s: Pascal second
rpm: rounds per minute
Reagents.

Unless otherwise noted, all parts, percentages, ratios, etc. in the examples and the rest of the specification are by weight, and all reagents used in the examples were obtained from general chemical suppliers such as, for example, Sigma-Aldrich Company, Saint Louis, Mo., USA.
Abbreviations for Reagents Used in the Examples are as Follows:
D177: Kayaset dye Disperse Red 177, acetic acid 2-{(2-cyano-ethyl)-[4-(6-nitro-benzothiazol-2-ylazo)-phenyl]-amino}-ethyl ester, obtained under trade designation "DISPERSE RED 177" from Orichem International Ltd., Hangzhou, China.

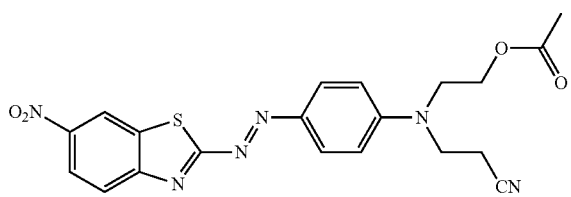 [SMILES: CC(=O)OCCN(CCC#N)c1ccc(/N=N/c2nc3ccc([N+](=O)[O-])cc3s2)cc1]

DMDO: 1,8-Dimercapto-3,6-dioxaoctane, obtained from TCI America, Portland, Oreg.
DVE: Diethyleneglycol divinyl ether, obtained from BASF Corp., Florham Park, N.J.
I-819: Phenylbis(2,4,6-trimethylbenzoyl)phosphine xxide, obtained under the trade designation "IRGACURE 819" from BASF Corp.
MEHQ: p-methoxy phenol.
NMP: N-methyl-2-pyrrolidone.
TAC: Triallylcyanurate, obtained from Sartomer, Inc., Exton, Pa.
Oligomer 1: A liquid polythioether oligomer prepared as follows. Into a 12-liter round bottom flask equipped with an air-driven stirrer, thermometer, and a dropping funnel, was added 4706 grams (25.8 moles) DMDO and 999 grams (3.0 moles) of a diglycidylether of bisphenol F, obtained under the trade designation "EPALLOY 8220" from Emerald Performance Materials, LLC, Cuyahoga Falls, Ohio; 1.7 grams 1,4-diazabicyclo[2.2.2]octane (DABCO) (0.02 weight percent) was mixed in as a catalyst. The system was flushed with nitrogen, then mixed and heated for four hours at 60° C. to 70° C. 150 grams (0.6 mole) of TAC was added along with approximate 0.4 grams 2,2'-azobis(2-methylbutyronitrile), obtained under the trade designation "VAZO-67" from E.I. du Pont de Nemours and Company, Wilmington, Del. The material was mixed and heated at approximately 60° C. for 3 hours. 3758 grams (18.6 moles) triethyleneglycol divinylether, obtained under the trade designation "RAPI-CURE DVE-3" from Ashland Specialty Ingredients, Wilmington, Del. was then added drop-wise to the flask over 4 hours, keeping the temperature between 60° C. to 70° C. 2,2'-azobis(2-methylbutyronitrile) was added as a solid in small portions over a time period of approximately 8 hours for a total of 1.2 grams. The temperature was raised to 100° C. and the material degassed for approximately 1 hour. The calculated molecular weight and functionality of the resultant polythioether oligomer were approximately 3200 and 2.2, respectively.

Example 1 and Comparative Examples A, B

Example 1

A curable polythioether composition was prepared as follows. A 40 mL opaque amber glass jar was charged with 5.000 grams DMDO, 3.1067 grams DVE, 1.2946 grams TAC, 0.0940 grams I-819 and 0.0005 grams D177. The vial was then sealed and placed on a laboratory roll mill at 21° C. until the solids had dissolved.

Comparative Example A

The procedure generally described in Example 1 was repeated, wherein no D177 was used.

Comparative Example B

The procedure generally described in Example 1 was repeated, wherein 0.0005 grams D177 was replaced with 0.0005 grams MEHQ.

Example 2 and Comparative Example C

Example 2

A 40 mL amber glass vial was charged with 10.000 grams Oligomer 1, 0.5700 grams TAC, 0.1057 grams I-819 and 0.0005 grams D177. The vial was then sealed and placed on a laboratory Speed Mixer, which then operated at 2000 rpm for 1 minute.

Comparative Example C

The procedure generally described in Example 2 was repeated, wherein no D177 was used.
Test Methods The following methods were used to evaluate the stability of the uncured samples and the color change upon curing.
Stability.

Examples 1 and Comparative Examples A, B were prepared as described above. Uncured resin stability, as a function of change in dynamic viscosity, was measured after 49 days at 21° C. in the amber jars. Results listed in Table 1 were measured using a model "AR2000" rheometer, obtained from TA Instruments, New Castle, Del.

Curing

Samples were poured into a nominally 2 by 2 by 0.2 cm silicone rubber mold and cured by exposure at 21° C., for 30 seconds at a distance of 1.27 cm, to a 455 nm LED, using a model "CF2000" controller, obtained from Clearstone Technologies, Inc., Minneapolis, Minn.

Color Measurement

The change in color upon curing, as defined by ΔE values, was measured using a colorimeter, such as a model "MINISCAN XE PLUS D/8S" or "MINISCAN EZ", in mode D65/10*, obtained from Hunter Associates Laboratory, Inc., Reston, Va. Results are listed in Table 2.

TABLE 1

| Sample | Hold Time (Days) | Shear Stress (Pa) | Dynamic Viscosity (Pa · s) |
|---|---|---|---|
| Comparative A | 0 | ~10 | 0.003~0.005 |
| Example 1 | 49 | 9.8238 | 0.856 |
| Comparative A | 49 | 9.9677 | 4.738 |
| Comparative B | 49 | 9.9583 | 3.661 |

TABLE 2

| Sample | Time Stored[a] | Curing Step | Color Measurements | | | |
|---|---|---|---|---|---|---|
| | | | L* | a* | b* | ΔE |
| Example 1 | 0 day | Before | 57.2 | 46.2 | 16.8 | 58.6 |
| | | After | 87.2 | -3.1 | 6.0 | |
| Comparative A | 0 day | Before | 88.1 | -9.7 | 17.7 | 17.0 |
| | | After | 87.7 | -2.4 | 2.3 | |
| Comparative B | 0 day | Before | 86.7 | -10.3 | 19.7 | 18.9 |
| | | After | 86.7 | -2.3 | 2.5 | |
| Example 1 | 49 days | Before | 69.3 | 41.8 | 16.8 | 49.0 |
| | | After | 86.5 | -2.7 | 5.3 | |
| Comparative A | 49 days | Before | 86.6 | -10.5 | 20.1 | 19.5 |
| | | After | 86.1 | -2.2 | 2.4 | |
| Comparative B | 49 days | Before | 87.2 | -10.5 | 20.1 | 19.6 |
| | | After | 87.6 | -2.3 | 2.3 | |
| Example 2 | 1 minute | Before | 30.3 | 60.3 | 44.4 | 50.5 |
| | | After | 54.0 | 33.8 | 8.4 | |
| Comparative C | 1 minute | Before | 80.1 | -9.4 | 19.7 | 17.7 |
| | | After | 80.2 | -2.0 | 3.6 | |

[a]Time that a sample was stored before evaluation.

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A curable composition comprising a polythiol; at least one unsaturated compound comprising more than one carbon-carbon double bond that is not part of an aromatic ring, carbon-carbon triple bond, or a combination thereof; and a dye compound represented by formula:

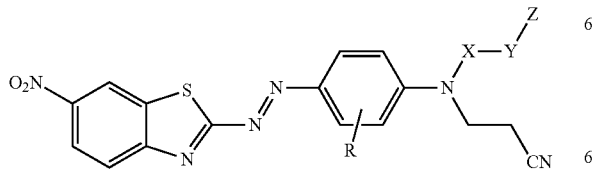

wherein

R is hydrogen or alkyl;

X is alkylene optionally interrupted by —O—;

Y is —O—, —S—, —NR$^1$—, —N(R$^1$)—C(O)—, —C(O)—N(R$^1$)—, —C(O)—O—, —S—C(O)—, —O—C(S)—, —C(S)—O—, —S—C(O)—O—, —(R$^1$)N—C(O)—O—, —O—C(O)—N(R$^1$)—, —(R$^1$)N—C(S)—O—, —O—C(S)—N(R$^1$)—, —S—C(O)—N(R$^1$)—, —(R$^1$)N—C(O)—N(R$^1$)—, or —(R$^1$)N—C(S)—N(R$^1$)—;

R$^1$ is hydrogen, alkyl, aryl, arylalkylenyl, or alkylarylenyl; and

Z is hydrogen, alkyl, aryl, arylalkylenyl, alkylarylenyl, heterocyclyl, or heterocyclylalkylenyl, wherein alkyl, aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of alkyl, heterocyclyl, and heterocyclylalkylenyl, oxo;

with the proviso that when Y is —S— or —O—, Z is other than hydrogen, and with the further proviso that Z is not a styrenyl group;

or wherein Y is —O—C(O)— or —O—C(O)—O—, and Z is aryl, arylalkylenyl, alkylarylenyl, heterocyclyl, or heterocyclylalkylenyl, wherein aryl, arylalkylenyl, alkylarylenyl, heterocyclyl, or heterocyclylalkylenyl are unsubstituted or substituted by at least one substituent selected from the group consisting of alkyl, alkoxy, hydroxyalkyl, haloalkyl, haloalkoxy, halogen, nitro, hydroxyl, cyano, amino, alkylamino, dialkylamine, and in the case of heterocyclylalkylenyl, oxo, with the proviso that Z is not a styrenyl group.

2. The curable composition of claim 1, wherein the polythiol is monomeric.

3. The curable composition of claim 1, wherein the polythiol is oligomeric or polymeric.

4. The curable composition of claim 1, wherein the polythiol and the at least one unsaturated compound are at least partially crosslinked to form a polymer network.

5. A method for indicating curing in a curable composition, the method comprising:
   providing the curable composition of claim 1, wherein the dye compound is present in the composition in an amount sufficient to provide the composition with a first absorbance at a wavelength in a range from 400 nanometers to 700 nanometers; and
   allowing the composition to at least partially cure to provide an at least partially cured composition, wherein the at least partially cured composition has a second absorbance at the wavelength that is different from the first absorbance.

6. A curable composition comprising a polythiol; at least one unsaturated compound comprising more than one carbon-carbon double bond that is not part of an aromatic ring; and a dye compound represented by formula:

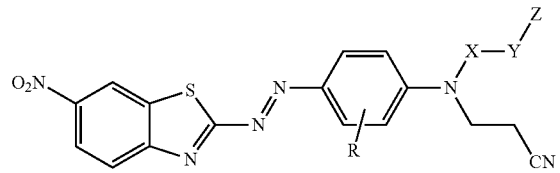

wherein

R is hydrogen or alkyl;
X is alkylene optionally interrupted by —O—;
Y is —O—C(O)—; and
Z is alkyl.

7. The curable composition of claim 6, wherein the polythiol is monomeric.

8. The curable composition of claim 6 wherein the polythiol is a polythioether oligomer or polymer or a polysulfide oligomer or polymer.

9. The curable composition of claim 8, wherein the polythiol is a polythioether oligomer or polymer prepared from components comprising a dithiol and a diene or divinyl ether and optionally a trithiol, triene, or trivinyl ether.

10. The curable composition of claim 6, wherein X is alkylene.

11. The curable composition of claim 6, wherein the at least one unsaturated compound comprises a diene, a divinyl ether, or a diallyl ether.

12. The curable composition of claim 6, wherein the at least one unsaturated compound comprising more than one carbon-carbon double bond comprises a divinyl ether.

13. The curable composition of claim 6, wherein the at least one unsaturated compound comprises two carbon-carbon double bonds, and wherein the curable composition further comprises a second unsaturated compound comprising three carbon-carbon double bonds.

14. The curable composition of claim 6, further comprising a free-radical initiator.

15. The curable composition of claim 14, wherein the free-radical initiator is a photoinitiator.

16. The curable composition of claim 14, wherein the free-radical initiator is a thermal initiator.

17. The curable composition of claim 6, further comprising at least one of silica, carbon black, calcium carbonate, aluminum silicate, or lightweight particles having a density of up to 0.7 grams per cubic centimeter.

18. A method of stabilizing a curable composition, the method comprising providing the curable composition of claim 6, wherein the dye compound is included in an amount sufficient to reduce a viscosity increase of the curable composition relative to a comparative composition that is the same as the curable composition except that it does not contain the dye compound.

19. An at least partially crosslinked polymer network comprising:

a polythiol at least partially crosslinked with at least one unsaturated compound comprising more than one carbon-carbon double bond that is not part of an aromatic ring; and a dye compound represented by the following formula:

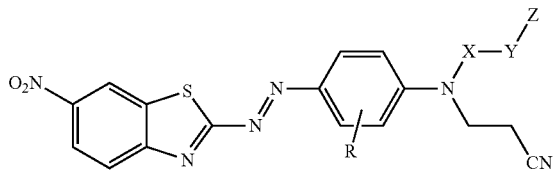

wherein

R is hydrogen or alkyl;
X is alkylene optionally interrupted by —O—;
Y is —O—C(O)—; and
Z is alkyl.

20. A sealant comprising the at least partially crosslinked polymer network of claim 19.

* * * * *

UNITED STATES PATENT AND TRADEMARK OFFICE
CERTIFICATE OF CORRECTION

PATENT NO. : 10,745,558 B2
APPLICATION NO. : 15/739485
DATED : August 18, 2020
INVENTOR(S) : Sheng Sheng Ye Page 1 of 1

It is certified that error appears in the above-identified patent and that said Letters Patent is hereby corrected as shown below:

Column 22
Line 5, in Claim 1, delete "S—C(O)—," and insert -- —S—C(O)—, --, therefor.

Column 23
Line 8, in Claim 8, delete "claim 6" and insert -- claim 6, --, therefor.

Signed and Sealed this
Tenth Day of November, 2020

Andrei Iancu
*Director of the United States Patent and Trademark Office*